US008491842B2

(12) United States Patent
Johansen et al.

(10) Patent No.: US 8,491,842 B2
(45) Date of Patent: Jul. 23, 2013

(54) RELEASE OF STORED AMMONIA AT START-UP

(75) Inventors: Johnny Johansen, København (DK); Jan Oechsle, Skovlunde (DK); Henning Schmidt, Dyssegård (DK); Tue Johannessen, Glostrup (DK); Jakob Svagin, Frederiksberg (DK)

(73) Assignee: Amminex Emissions Technology A/S, Søborg (DK)

( * ) Notice: Subject to any disclaimer, the term of this patent is extended or adjusted under 35 U.S.C. 154(b) by 9 days.

(21) Appl. No.: 12/553,173

(22) Filed: Sep. 3, 2009

(65) Prior Publication Data

US 2010/0086467 A1 Apr. 8, 2010

Related U.S. Application Data

(60) Provisional application No. 61/103,300, filed on Oct. 7, 2008.

(30) Foreign Application Priority Data

Oct. 6, 2008 (EP) .................................. 08017496

(51) Int. Cl.
*B01J 19/00* (2006.01)
*G05D 23/00* (2006.01)
*G05D 16/00* (2006.01)

(52) U.S. Cl.
USPC ............ 422/108; 422/109; 422/112; 206/0.7; 423/352

(58) Field of Classification Search
USPC ......... 423/352; 222/3, 146.2, 52, 61; 206/0.7; 95/128; 62/48.1, 49.1, 159
See application file for complete search history.

(56) References Cited

U.S. PATENT DOCUMENTS 5,161,389 A 11/1992 Rockenfeller et al.
6,508,063 B2 * 1/2003 Sato ............................... 62/48.1

FOREIGN PATENT DOCUMENTS

| EP | 1 992 397 | 11/2008 |
|---|---|---|
| WO | WO 99/01205 | 1/1999 |
| WO | WO 2006/012903 | 2/2006 |
| WO | WO2006081824 | * 8/2006 |
| WO | WO 2008/077626 | 7/2008 |
| WO | WO 2008/077652 | 7/2008 |
| WO | WO 2008/092500 | 8/2008 |

OTHER PUBLICATIONS

Coulson, John, and Richardson, John, Chemical Engineering: Solutions to the Problems in Chemical Engineering, Elsevier, vol. 3, p. 452.*
European Search Report dated Mar. 20, 2009 for Application No. EP08017496.
European Search Report dated Mar. 13, 2009 for Application No. EP 08 01 7496.
Communication dated Jul. 6, 2010 for Application No. EP 08 017496.

* cited by examiner

*Primary Examiner* — Steven Bos
*Assistant Examiner* — Justin Bova
(74) *Attorney, Agent, or Firm* — Frost Brown Todd LLC

(57) ABSTRACT

A system for storage and dosing of ammonia, including a solid ammonia storage material capable of binding and releasing ammonia reversibly by adsorption/absorption. The system is able to release ammonia gradually according to a demand that can vary over time with intermediate periods of no ammonia demand. A main storage unit and a start-up storage unit are provided. The storage units hold ammonia storage material. At least one one-way valve is provided via which the one main storage unit is in communication with the start-up storage unit. The one-way valve prevents any backflow of ammonia from the start-up storage unit to the main storage unit. Heating devices are arranged to heat the main storage unit and the start-up storage unit separately to generate gaseous ammonia by thermal desorption from the solid storage material. A controller controls the heating power of the main storage unit and the start-up storage unit, thereby enabling ammonia release from at least one of the start-up and/or the main storage unit. A dosing valve controls ammonia flow from the storage units according to a demand.

12 Claims, 8 Drawing Sheets

Method for determining $P_{main}$ (Fig. 1 to 3)

While1($P_{main} < P_{sp}$)
   Stop heating of Start Up
   Measure P
   While2($P > P_{thresh}$ AND Sum($m_i$)<$m_{StartUp}$)
      Dose amount of ammonia $m_i$
   End(While2)
   If $P > P_{thresh}$ Then $P_{main} = P$
   Start heating of Start Up
   Wait(dt)
End(While1)

dt is smaller than characteristic heating time of Main.
$m_i$ is smaller than the capacity in Start Up without heating, $m_{StartUp}$.

Fig. 4

Method for determining $P_{main}$ (Fig. 5)

While1($P_{main} < P_{sp}$)
  Close NO valve
  Measure P
  While2($P > P_{thresh}$ AND Sum($m_i$)<$m_{tubing}$)
    Dose amount of ammonia $m_i$
  End(While2)
  If $P > P_{thresh}$ Then $P_{main} = P$
  Open NO valve
  Wait(dt)
End(While1)

dt is smaller than characteristic heating time of Main.
$m_i$ is smaller than the amount in tubing, $m_{tubing}$.

RELEASE OF STORED AMMONIA AT START-UP

This application is based upon and claims priority from U.S. Provisional Patent Application Ser. No. 61/103,300, filed Oct. 7, 2008, incorporated herein by reference.

FIELD OF THE INVENTION

This invention relates to a system and method for storage and dosing of ammonia.

BACKGROUND OF THE INVENTION

Ammonia is a widely used chemical with many applications. Some of these applications are (but not limited to): a) reductant for selective catalytic reduction (SCR) of NOx in exhaust from combustion processes, b) ammonia used as an energy carrier for a fuel cell or c) ammonia used as a reactant or additive in a chemical reaction. For most applications, the storage of ammonia in the form of a pressurized liquid in a vessel is too hazardous and a storage method involving absorption in a solid may circumvent the safety hazard of anhydrous liquid ammonia.

Metal ammine salts are ammonia absorbing materials, which can be used as solid storage media for ammonia (see, e.g. WO 2006/012903 A2), which in turn, for example, may be used as the reductant in selective catalytic reduction to reduce NO emissions, see e.g. WO 1999/01205.

Usually, ammonia is released by thermal desorption, e.g. from metal ammine salts, by external heating of a storage container, see e.g. WO 1999/01205. The heating elements may also be placed inside the storage container, see e.g. U.S. Pat. No. 5,161,389 and WO 2006/012903 A2.

WO 1999/01205 discloses the use of ammonia as the reductant in selective catalytic reduction to reduce $NO_x$ emissions from automotive vehicles. The ammonia is released from an either adsorptive or absorptive solid storage medium, among others $Sr(NH_3)_8Cl_2$ or $Ca(NH_3)_8Cl_2$ in granular form, in a storage container and temporarily stored as a gas in a buffer volume. The amount of ammonia to be supplied to a reaction volume in the vehicle's exhaust system is dosed under the control of an electronic engine controller according to the current operating state of the engine (WO 1999/01205, p. 9, last para.). The amount of ammonia to be desorbed from the storage medium is, for example, controlled by a feed-back control in which the pressure in the storage container is measured by a pressure sensor, and if the pressure reaches a pressure threshold, the supply of heat is interrupted (WO 1999/01205, para. bridging p. 8 and 9).

SUMMARY OF THE INVENTION

The invention pertains to a system for storage and dosing of ammonia. The system comprises a solid ammonia storage material capable of binding and releasing ammonia reversibly by adsorption/absorption. The system is able to release ammonia gradually according to a demand that can vary over time with intermediate periods of no ammonia demand. It comprises a main storage unit and a start-up storage unit. The storage units hold ammonia storage material. It further comprises at least one one-way valve via which the one main storage unit is in communication with the start-up storage unit. The at least one one-way valve prevents any back-flow of ammonia from the start-up storage unit to the main storage unit. It further comprises heating devices arranged to heat the main storage unit and the start-up storage unit separately to generate gaseous ammonia by thermal desorption from the solid storage material. It also comprises a controller arranged to control the heating power of the main storage unit and the start-up storage unit, thereby enabling ammonia release from at least one of the start-up and the main storage units. It further comprises a dosing valve arranged to control ammonia flow from the storage units according to a demand.

According to another aspect, a method is provided of storing and dosing ammonia from a solid ammonia storage material capable of binding and releasing ammonia reversibly by adsorption/absorption. The method enables ammonia to be released gradually according to a demand that can vary over time with intermediate periods of no ammonia demand. The method uses a storage and dosing system as defined above, and comprises:

heating the start-up storage unit and the main storage unit, as a consequence of which the start-up storage unit will usually reach a desired minimum pressure before the main storage unit will reach that pressure, so that the at least one one-way valve is then closed and thereby prevents any back-flow of ammonia from the start-up storage unit to the main storage unit, dosing ammonia according to the demand, when the main storage unit reaches a pressure higher than that downstream the one-way valve, the one-way valve opens and enables ammonia to pass the one-way valve.

Other features are inherent in the methods and products disclosed or will become apparent to those skilled in the art from the following detailed description of embodiments and its accompanying drawings.

BRIEF DESCRIPTION OF THE DRAWINGS

FIG. 4 illustrates an embodiment of a method to infer the pressure in the main storage unit based on a measurement of the downstream pressure;

FIG. 6 illustrates an embodiment of a method to infer the pressure in the main storage unit based on a measurement of the downstream pressure for an embodiment with a normally-open valve, as in FIG. 5;

Functionally and/or structurally equal parts cany the same reference number throughout the drawings.

Embodiments of the invention will now be described, by way of example, and with reference to the accompanying drawings.

DESCRIPTION OF EMBODIMENTS

Figure 1:
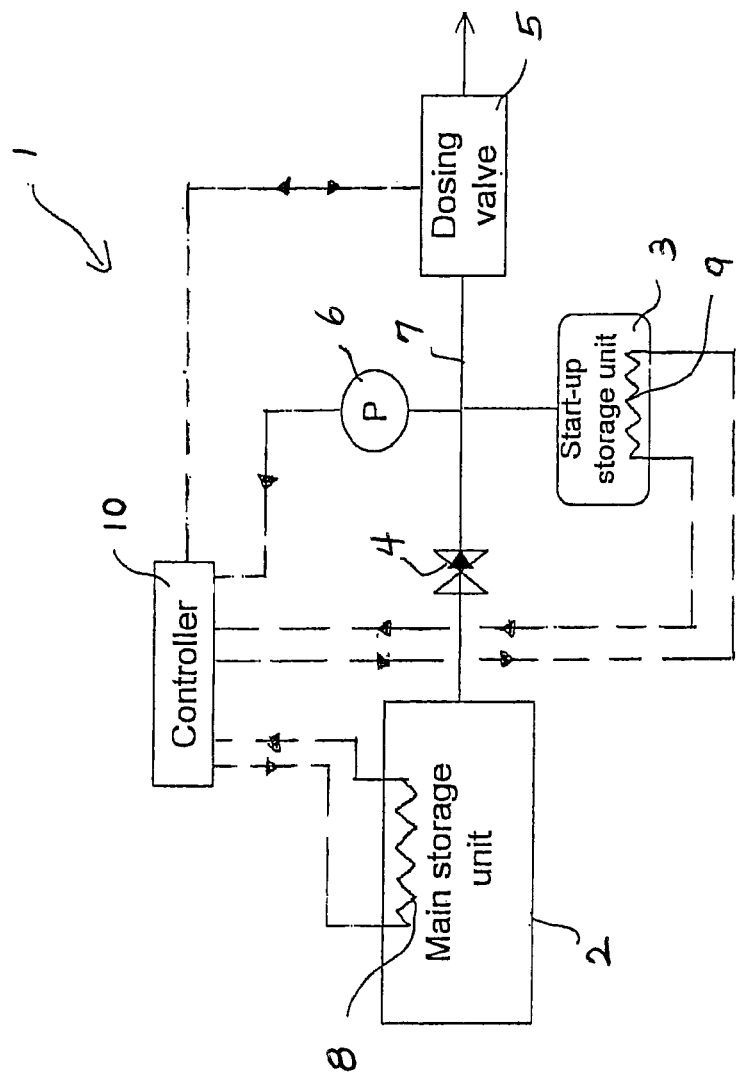
FIG. 1 is a schematic diagram illustrating an embodiment of an ammonia storage and dosing system with start-up storage unit and main storage unit.

FIG. 1 is a schematic diagram illustrating an embodiment of an ammonia storage and dosing system with start-up storage unit and main storage unit. Before proceeding further with the detailed description of FIG. 1, however, a few items will be discussed.

WO 1999/01205 discloses ammonia stored in one storage compartment. In the context of the present invention, however, it has been recognised that if all the storage material is placed in one large container there might be a challenge of doing rapid start-up where ammonia is to be delivered after a short operating time. It has been recognised that making the entire system more modular is a way of lowering the challenges of having one big container (the modules are also called "containers" or "units" hereinafter). The main challenge of having a single, large container is that when the container is far from fully saturated with ammonia, it requires relatively more energy (and thus time) to raise the temperature of the storage material to a level where ammonia has a suitable desorption pressure. With a modular system, the total ammonia storage capacity is separated into more than one container. Once one of the containers has been completely or partially depleted of stored ammonia, one begins using the next of the available modules, and therefore does not have to raise the temperature of the "dead weight" represented by the (completely or partially) depleted module(s).

For such a modular technology, e.g. to be installed as an ammonia delivery system on e.g. a passenger diesel car for NOx abatement, the system should preferably be able to deliver ammonia as soon as the exhaust temperature has reached 200° C. (which usually takes place after approx. 2 minutes), and it also should preferably be done without using too much power.

If the total capacity is separated into a plurality of containers capable of housing solid ammonia-containing storage material, e.g. two containers, at least the two containers are separated by a valve in order to avoid that a unit that has a lower ammonia desorption pressure (e.g. because it has a lower temperature than the other container, or because it is depleted relative to the other container) "withdraws" ammonia from the warmer, or fuller, container by the gradient in equilibrium desorption pressure (a cooler, or emptier, container has a lower ammonia desorption pressure than a warmer, or fuller, container. An ammonia flux can also be caused by the containers holding different materials, with different affinity for ammonia).

The system for storage and dosing of ammonia comprises a solid ammonia storage material capable of binding and releasing ammonia reversibly by adsorption/absorption. In some of the embodiments, the ammonia storage material is a metal ammine salt. Metal ammines salts are ammonia absorbing materials, which can be used as solid storage media for ammonia (cf., e.g., WO 2006/012903 A2). The ammonia is, for example, released from an either adsorptive or absorptive solid storage medium, among others $Sr(NH_3)_8Cl_2$ or $Ca(NH_3)_8Cl_2$ in granular form, in a storage container and temporarily stored as a gas in a buffer volume. Thus, the metal-ammine salt constitutes a solid storage medium for ammonia, which represent a safe and practical option for storage and transportation of ammonia. The released ammonia, in turn, may be used, for example, as the reductant in selective catalytic reduction to reduce $NO_x$ emissions (cf. WO 1999/01205).

The system is able to release ammonia gradually according to a demand that can vary over time with intermediate periods of no ammonia demand. Ammonia can be gradually released from the storage material with rapid start-up capability in multiple start-up events where the ammonia release can be terminated in between and then initiated at a later event. "Gradual ammonia demand" means that the stored ammonia is not demanded all at once, but in a distributed way over an extended period of time (for example, over some hours) with a varying rate, or even intermittently.

In some of the embodiments the released ammonia is used for one of the following applications (but not limited to): (a) reductant for selective catalytic reduction (SCR) of $NO_x$ in exhaust from combustion processes, (b) ammonia used as an energy carrier for a fuel cell or (c) ammonia used as a reactant or additive in a chemical reaction. For many applications, the storage of ammonia in the form of a pressurized liquid in a vessel would be too hazardous; however, a storage method involving absorption in a solid may circumvent the safety hazard of anhydrous liquid ammonia. In some of the embodiments ammonia is used as the reductant in selective catalytic reduction to reduce $NO_x$ emissions from automotive vehicles.

As an example of the application (a), in some of the embodiments the system is used as an ammonia delivery system on a vehicle for $NO_x$ abatement for SCR. The desorbed ammonia is to be used as the reductant in a selective catalytic reduction to reduce $NO_x$ emissions, e.g. from automotive vehicles, boilers and furnaces. Thus, the system is, e.g. arranged to remove $NO_x$ from an oxygen-containing exhaust gas of a combustion engine or combustion process. For example, in some of the embodiments, a feed line (which may include a buffer volume) is provided which is arranged to feed released gaseous ammonia from the container directly into the exhaust gas in the desired amount, e.g. dosed by the controllable valve. In a reaction volume in the exhaust system, a catalyst is provided for reducing $NO_x$ by reaction with the ammonia. In some embodiments, the combustion engine is a mobile or immobile combustion engine unit fuelled by diesel, petrol, natural gas, coal, hydrogen or other fossil, biological, or synthetic fuel. The $NO_x$ to be removed may be produced by an automobile, truck, train, ship or other motorized machine or vehicle, or by a power plant for generating electricity.

As an example of the application (b), in some of the embodiments, the desorbed ammonia is to be used, directly or indirectly, as a fuel, e.g. for a power generating unit. For example, in some of these embodiments, the desorbed ammonia is used to produce hydrogen in a catalytic ammonia-cracking reactor, and the hydrogen is used as fuel in a fuel cell capable of operating on gaseous hydrogen. In other embodiments, a fuel for a fuel cell capable of operating on ammonia is directly operated with the desorbed ammonia. The gaseous ammonia is dosed into the ammonia-cracking reactor or directly into the fuel cell, e.g. by the controllable valve. In some embodiments in which the system is used as ammonia supply to a fuel cell system (either running directly on ammonia or a fuel cell system running on hydrogen where the ammonia is pre-cracked to $H_2+N_2$) the smaller start-up unit may be electrically heated and the main unit is getting energy for ammonia desorption e.g. from a hot product gas from an combustion process or from a fuel cell.

In the context of an application of the type (a), the ammonia demand is substantially that amount of ammonia that is able to remove all the $NO_x$ in the exhaust gas; however, if it is not tolerable that any ammonia escapes to the atmosphere, a smaller proportion may be dosed into the exhaust gas to ensure that substantially all the ammonia is reacted. In some embodiments, the ammonia demand is determined based on a measurement of the $NO_x$ in the exhaust gas, e.g. measured by an $NO_x$ sensor. In other embodiments, information from an engine controller or combustion process controller about the operating state is used to estimate the $NO_x$ expected in the present operating state. For example, the operating state may be defined by the current engine velocity, current load, current drive pedal position, etc.; knowing these parameters enables the expected $NO_x$ in the exhaust gas to be calculated and, in turn, the ammonia demand to remove the $NO_x$. In some embodiments $NO_x$ measurement and $NO_x$ calculation, based on the engine controller, are combined in order to get a faster, but nevertheless precise, demand indication.

In the context of an application of the type (b), the ammonia demand is substantially that amount of ammonia that has to be provided to the reactor, or the fuel cell, so that the fuel cell is able to produce the power required.

For mobile units, e.g. vehicles in application of the type (a) or (b), it is particularly useful to hold the storage material (e.g. metal ammine complex) in a container that can be easily separated from the mobile unit and replaced by a new metal ammine container or recharged with ammonia in-situ. In one embodiment of replacement of containers, the metal ammine containers are recycled and recharged with ammonia in a separate recharging unit or recharging facility.

At least one of the at least two containers functions a start-up storage unit, and the other one (ore ones) function(s) as the main storage unit(s). In some embodiments, the main storage unit is made up of multiple cartridges able to accommodate solid ammonia storage material. In some embodiments, the start-up storage unit has a smaller ammonia storage capacity than the main storage unit, e.g. a capacity in the range from 1%-70%, preferably 1%-50%, or 1%-30% of that of the main storage unit. With the storage capacity being smaller, the typical heat transfer distance is smaller so that, as a consequence, the elevated temperature range at which a sufficient amount of ammonia is released can be reached faster than with a main storage unit having a larger storage capacity. In other embodiments, the start-up unit is designed differently from the main storage unit in that the start-up unit has more powerful heating and/or the heat transfer is improved, e.g. by a providing the heat source with a bigger surface, and/or by providing heat transfer elements with a finer structure so that the typical distance of the heat transfer from the heating source to the ammonia storage material is smaller, compared with the main storage unit. By these measures, the elevated temperature range at which a sufficient amount of ammonia is released can also be reached faster than with the main storage unit. In some embodiments, both measures are combined, i.e. the start-up unit has a smaller storage capacity and more powerful heating or faster heat transfer.

In some embodiments, the main storage unit is single ammonia-storage container. In other embodiments, however, the main storage unit is composed of several ammonia-storage containers forming sub-units. In some of the latter embodiments, the individual sub-units of the main storage unit are connected in parallel to the start-up unit, in other embodiments they are connected in series to it. In some embodiments there is only one one-way valve between the main storage unit (i.e. all its parallel or serially connected sub-units) and the start-up unit. In other embodiments, there are valves (e.g. one-way valves) between the sub-units, and a valve between the first sub-unit (the one directly upstream the start-up unit) and the start-up unit (if the sub-units are connected serially), or valves between the sub-units and the start-up unit (if the sub-units are connected in parallel).

As already mentioned above, the system has at least one one-way valve via which the main storage unit is in communication with the start-up storage unit. The one-way valve prevents any back-flow of ammonia from the start-up storage unit to the main storage unit. One-way valves allow gas to flow only in one direction, provided that the source pressure is higher than the destination pressure. In some embodiments the one-way valves are passive values, i.e. they obtain their actuation energy (i.e. the energy to open and close) from the pressure difference between the two sides separated by the valve (e.g. by a membrane separating the two sides and deformed according to the pressure difference, the membrane deformation actuating the valve), so that the one-way valve function is achieved without any supply of external actuation energy. The passive one-way valves have no pressure sensors (the element (e.g. the membrane) that draws energy from the pressure difference is not considered as a "pressure sensor"). In some other embodiments, the valves are active valves, i.e. valves with supply of external actuation energy to achieve the one-way valve function, e.g, solenoid valves actuated by supply of electric power. Typically, the valve is controlled by electronic control circuitry or a microcomputer that receives signals representing the absolute pressures on both sides of the valve (or a signal representing the pressure difference), and causes the valve to open if the source pressure is above the destination pressure.

In some of the embodiments, ammonia is released by thermal desorption, from the storage material, e.g. from metal ammine salts. Accordingly, in some of the embodiments, the system further comprises heating devices arranged to heat the main storage unit and the start-up storage unit separately to generate gaseous ammonia by thermal desorption from the solid storage material. In some of the embodiments, heating elements are placed inside the storage container, see cf. U.S. Pat. No. 5,161,389 and WO 2006/012903 A2, in order to ascertain an improved, and faster, heat transfer to the storage material, for example, compared with external heating elements. In some embodiments, the heating elements are electric resistance heaters, in other embodiments they are heat exchangers supplied with heat from a hot product gas from a combustion process (e.g. the combustion in a vehicle's engine).

In some of the embodiments, the system also comprises a controller arranged to control the amount of desorption energy provided to each storage unit. The controller is arranged to control the heating power of the main storage unit and the start-up storage unit, thereby enabling ammonia to be released from the start-up and/or the main storage units. In some of the embodiments, the system further comprises a dosing valve arranged to control ammonia flow from the storage units according to a demand. The dosing valve is a controllable valve arranged to control the amount of ammonia that is delivered from the system to an ammonia consuming process in the desired proportion. With the pressure difference across the dosing valve being known (e.g. by measurement, in some embodiments the mass flow of ammonia delivered to the ammonia consuming process is calculated. In some of the embodiments, there is a buffer volume between the main storage unit and/or start-up unit and the dosing valve.

In some of the embodiments, the amount of ammonia to be supplied to a reaction volume e.g. in a vehicle's exhaust system is dosed under the control of an electronic engine controller according to the current operating state of the engine (WO 1999/01205, p. 9, last para.). In some of the embodiments, the amount of ammonia to be desorbed from the storage medium is, for example, controlled by a feed-back control in which the pressure in the storage container is measured by a pressure sensor, and if the pressure reaches a pressure threshold, the supply of heat is interrupted (WO 1999/01205, para. bridging p. 8 and 9). In other embodiments, the supply of heat is controlled in a feed-forward manner based on the current ammonia demand, which is known, e.g., by an engine controller that provides an ammonia demand signal. In some of the embodiments, such a feed-forward control is combined with a feed-back control as mentioned above, that causes the supply of heat to be stopped if the pressure rises above the pressure threshold.

The embodiments with some or all of the structure and functions described so far enable one or more of the following system features:
- safe storage of ammonia in a solid by absorption/adsorption (not indirectly as e.g. urea).
- ability to do rapid start-up and deliver ammonia after e.g. 0.1-5 minutes.
- ability to do relatively rapid start-up, even when the storage system is almost fully depleted from ammonia
- a modular construction in the sense that the ammonia capacity is separated into at least two storage containers
- in embodiments with passive one-way valves, a minimization of active valves and pressure sensor components to operate the system.

The system for storage and dosing of ammonia can, for example, be used as a mobile or de-central ammonia storage and delivery system. The system uses ammonia stored by ad- or absorption in a solid and the system is able to gradually release its ammonia over a large time span; the system is able to carry out many so-called rapid cold starts. In a typical exemplary application, such as catalytic reduction (SCR) of $NO_x$ in exhaust from a car engine, a cold start can be exemplified as a car that starts after an extended period of parking and then requires ammonia for the reduction of $NO_x$ by an SCR catalyst in the exhaust line.

In some embodiments, heating of the start-up and main units always happens simultaneously, so that the controller need not be able to control the heating systems of the start-up unit and the main unit independently. However, in other embodiments, the controller is arranged to control the heating systems start-up unit and the main unit independently. It is further arranged to cease heating of the start-up storage unit when the pressure in the main storage unit has reached a desired ammonia supply pressure. The "desired ammonia supply pressure" is typically a pressure in the range of ammonia pressure acceptable for normal operation of the ammonia storage and dosing system, not too close to the lower end of this range, to assure normal continued operation even if the ammonia demand is high.

When heating of the start-up unit is ceased, the start-up unit will begin to resaturate when the pressure in the main unit is higher than the pressure in the start-up unit. Resaturation will occur regardless of whether or not the main unit reaches the desired dosing pressure. The rate of resaturation will increase when the start-up unit cools down. This is because the equilibrium desorption pressure is temperature dependent; it decreases with decreasing temperature. An advantage of having a system where ammonia can be transferred from the main unit to the start-up unit through passive valve, is that the system will keep transferring ammonia even though the system is powered off. This will ensure that the start-up unit always has sufficient ammonia to do the quick start up and initial ammonia dosing which is required by e.g. automotive vehicles.

Some of the embodiments have a pressure sensor to determine the ammonia pressure that prevails in the main unit. Knowledge of the pressure is used, in some of the embodiments with individually controllable heating systems, in order to know when the main unit has reached the desired ammonia supply pressure, e.g. to cease heating of the start-up storage unit. As will be explained below, in order to determine the pressure that prevails in the main unit, the pressure sensor is not necessarily located upstream of the one-way valve—it can also be located downstream of the one-way valve, when the pressure in the main unit can inferred from the pressure measured downstream of the one-way valve.

In some of these embodiments, a pressure sensor is arranged downstream of the at least one one-way valve to measure the pressure in connecting tubes between the at least one one-way valve and the dosing valve. This pressure sensor will measure the pressure that bears upon the dosing valve. In some of the embodiments this downstream pressure sensor can be considered as a part of the "mass flow meter" that determines the mass flow of the ammonia dosed: The current mass flow can be calculated from the known extent of opening of the dosing valve and the measured pressure that bears upon the dosing valve.

In some of the embodiments, a pressure sensor is arranged upstream of the one-way valve to measure the pressure in the main storage unit directly. For example, the upstream pressure sensor measures the pressure in connecting tubes between the main storage unit and the one-way valve. The upstream pressure sensor may be provided in addition to the downstream pressure sensor. In some embodiments, however, there is no downstream pressure sensor (the mass flow meter is then, for example, based on a direct measurement of the gas flow through a dosing valve). Moreover, in some of the embodiments in which the main storage unit is composed of a plurality of sub-units, there are multiple upstream pressure sensors (e.g. one per sub-unit) to judge when a given sub-unit—in a warm-up phase—is ready for ammonia release. In embodiments with the ability of heating sub-units selectively, these multiple upstream pressure sensors enable a direct measurement to be made of the ammonia pressure in the sub-unit which is currently being made ready by heating.

As mentioned above, alternatively the pressure in the main unit can inferred from the pressure measured downstream of the one-way valve. Accordingly, in some embodiments the system does not have a pressure sensor upstream of the at least one one-way valve, or does at least not use a pressure sensor upstream of the at least one one-way valve to measure the pressure in the main storage unit. Rather, the pressure in the main storage unit is determined based on a measurement of the pressure downstream of the at least one one-way valve.

In some of the embodiments in which the pressure in the main storage unit is determined based on the downstream-pressure measurement, the determination of the pressure in the main storage unit based on a concept in which ammonia supply by the storage material in the start-up unit is reduced or stopped, but ammonia withdrawal from the system (i.e. dosing) is continued, and the downstream pressure then measured is considered as an indication of the pressure in the main storage unit. The reduction or stop of ammonia supply can be caused e.g. by reducing or stopping the supply of heating power to the start-up unit (alternatively, in some embodiments, the start-up unit of is cut off by an additional normally-open valve). Therefore, in some of these embodiments, the determination of the pressure in the main storage unit is also based on the amount of ammonia released through the dosing valve, and/or the heating power used for the start-up unit.

In some of the embodiments, the pressure in the main storage unit is determined as follow, and the heating-power controller (or another controller), is arranged to determine the pressure in the main storage unit by carrying out a method as follows:
(a) interrupting ammonia release from the start-up storage unit;
(b) relieving pressure in the system;

(c) measuring the pressure with the pressure sensor downstream the at least one one-way valve, and inferring from this measurement the pressure of the main storage unit.

The measures (a) and (b) cause the pressure downstream the one-way valve to decrease and, when the downstream pressure falls below the upstream pressure, provoke the one-way valve to open, so that the downstream pressure equals the upstream pressure and, consequently, the pressure measured at (c) by the downstream sensor corresponds to the upstream pressure.

As already indicated above, in some of embodiments, the interruption of ammonia release from the start-up storage unit is achieved by turning off the heating of the start-up storage unit. Due to thermal inertia, this will functionally not result in an instantaneous interruption, but in a continuous decrease of the ammonia release, according to the thermal time constant of the start-up storage unit.

Alternatively, as already indicated above, in other embodiments a normally open valve is provided located at the outlet of the start-up storage unit. Instantaneous interruption of ammonia release from the start-up storage unit is there achieved by closing the normally open valve.

Complementary to the interruption of ammonia release from the start-up storage unit, pressure is relieved, in order to provoke the one-way valve to open. In some embodiments, said pressure relief is achieved by continuing dosing of ammonia.

In some embodiments, the system comprises a controller that controls the amount of desorption energy provided to each storage unit in such a way that the controller determines when the main storage unit is ready for ammonia release in a situation where the start-up unit has been used for rapid start-up while waiting for the main storage unit to be operable. The one way valve avoids back-flow from the start-up unit to the main storage unit. In some embodiments, a control algorithm infers the pressure in the main storage unit (or all the main storage unit's sub-units, if any) from the measured pressure downstream of the one-way valve.

Thus, the pressure in the main storage unit is inferred from the pressure measured downstream the at least one one-way valve, by assuming that the pressure measured when the one-way valve is (presumably) open is the pressure in the main storage unit. In some embodiments the amount of ammonia that is still present in the tubing downstream of the at least one one-way valve and/or the unheated start-up unit is also taken into account. In these embodiments, the assumption that the upstream pressure is the pressure measured by the downstream pressure sensor is only made when the amount dosed after having stopped the heating of the start-up is larger than the available ammonia amount in the tubing downstream the at least one one-way valve and/or the unheated start-up unit. In embodiments in which ammonia release from the start-up storage unit is achieved by closing a normally open valve, the assumption is made when the amount dosed after having closed the normally open valve is larger than the available ammonia amount in the tubing downstream the at least one one-way valve and the normally open valve.

As explained above, when the downstream pressure falls below the upstream pressure, the one-way valve will open. In some embodiments it is not known when this happens. In these embodiments, a sort of security margin is applied after the ammonia release has been stopped and dosing has been continued, by ascertaining whether the downstream-pressure decreases below a (relatively small) lower threshold. In other embodiments, an information signal is provided that indicates opening of the one-way valve, and the pressure in the main storage is determined as the measured pressure at the time when opening of the one-way valve is indicated. In some embodiments, such an information signal is obtained by a valve sensor sensing the one-way valve's open-or-closed state. In other embodiments, this information signal is produced based on the fact that one or more pressure spikes will be observable in the measured downstream pressure when the one-way valve opens. Accordingly, in these embodiments, a detection of one or more pressure spikes by the downstream pressure sensor indicates that the one-way valve has opened.

By providing a start-up storage unit specifically dimensioned for rapid start-up, the desired ammonia supply pressure is reached in a desired time independent of the heating time of the main storage or units.

In some embodiments the system comprises a pressure relief valve that can relieve the pressure from the start-up storage unit into the main storage unit. The relief pressure can be set to different levels according to system components and the desired level of operating safety. The pressure relief valve is a check valve (one-way) that will only allow flow in one direction, to with the direction from the start-up unit to the main storage unit. This may be useful in some embodiments because, in some embodiments, the pressure in the start-up can be difficult to control and relieving a pressure overshoot into the main cartridge will help keep the operating pressure of the start-up unit within the desired range. Relieving the pressure of the start-up into the main unit, can be done without a significant increase in the net consumption of ammonia from the start-up, because the ammonia that is let into the main unit will cause the main unit to reach operating pressure quicker, and hence reduce the necessary operating time on the start-up unit. Since the main unit is bigger than the start-up unit, the resulting ammonia pressure by relieving pressure from the start-up into the main unit, will be lower and thus increasing the operation safety of the system. Although an embodiment with this additional pressure relief valve is shown in FIG. 8 in conjunction with an upstream pressure sensor (as in FIG. 7), this is only exemplary; an additional pressure relief valve can also be used in all the other embodiments described and/or shown in the figures.

Returning now to FIG. 1, which shows an ammonia storage and dosing system 1 with a main storage unit 2 and a start-up storage 3. In the example of FIG. 1, the main storage unit 2 is made up of a single storage container which holds ammonia storage material. In other embodiments (FIGS. 2 and 3) the storage material of the main unit is held in more than one container. In the embodiments illustrated, at least one container, here the start-up storage unit 3, is small compared to the others, enabling rapid start up. The number and the size of the other containers that make up the main storage unit are given from the desired total ammonia amount and the required start up time of the main unit.

The coupling of several storage containers can be performed in a variety of different ways in combination with passive one-way valves (but alternatively also with active valves), pressure sensors, pressure switches etc. In the following, preferred embodiments are described that focuses on building a mechanical system with as few active components as possible and with clever control algorithms that enable optimum performance even without monitoring all pressures and temperatures. In particular the embodiment enables measurements of pressure in all containers using a single pressure sensor.

In the embodiment of FIG. 1, the main storage unit 2 and the start-up storage unit 3 are in fluid-communication via a passive one-way valve 4. The start-up storage unit 3 is in fluid-communication with a dosing valve 5 by which ammonia from the storage units 2, 3 is dosed according to a demand. The dosing 5 valve is a controllable valve arranged to control the amount of ammonia that is delivered from the system 1 to an ammonia consuming process in the desired proportion.

The one-way valve 4 is closed when the pressure downstream of it (i.e. the pressure in the start-up storage unit 3) is higher than that upstream of it (i.e. lower than the pressure in the main storage unit), and opens when the upstream pressure becomes higher than the down-stream pressure.

A pressure sensor 6 is in fluid-communication with the start-up storage unit 3, the down-stream side of the one-way valve (check valve) 4, and the dosing valve 5. The pressure sensor 6, the start-up storage unit 3, the downstream side of the one-way valve 4, and the dosing valve 5 are connected by tubing 7. In the embodiment shown, no other pressure sensor is provided (in particular, there is no pressure sensor upstream of the one-way valve 4). All these components or combinations hereof can be mounted in one compact valve and sensor block.

The main storage unit 2 and the start-up storage unit 3 are equipped with heating devices 8, 9, e.g. electric heaters placed inside the main-storage-unit and the start-up-storage-unit containers.

A controller 10 is able to control (switch on or off, and/or regulate) the heating devices 8; 9 independently from each other, e.g. by controlling the power supplied to them. The controller 10 also receives a signal from the downstream pressure sensor 6 that represents the pressure currently measured by it. The controller 10 is also arranged to control the dosing valve 5, e.g. by providing it with a variable dosing target value (for example, the dosing target value prescribes a certain degree of opening of the dosing valve).

The system 1, by means of the larger main storage unit 2 and the smaller start-up storage unit 3, ensures rapid start-up that can be controlled by the single pressure sensor 6 by separating the storage units 2, 3 by the one-way valve 4, according to the scheme shown in FIG. 1. The pressure sensor 6 is placed on the same line 7 as the smaller (more rapid) start-up storage unit 3, which is located on the downstream side of the one-way valve 4 and the larger main storage unit 2. It can be determined when the pressure of both the smaller start-up storage unit 3 and the larger main storage unit 2 has reached a desired ammonia supply pressure, by employing an algorithm which is using one or more of the following parameters:

a) the pressure measured by the pressure sensor 6,
b) the heating power used for one or more of the storage units 2,3,
c) the temperature of one or more storage units 2, 3,
d) the amount of ammonia released through the dosing valve 5
e) the operating time.

Using a one-way valve 4 will allow the main storage unit 2 to resaturate the smaller (rapid) start-up storage unit 3 with ammonia, e.g. in situations where the whole system 1 is powered off (because the pressure in the main storage unit 2 will be higher than that in the start-up storage unit 3, when the main storage unit 3 is more saturated), or where heating of the start-up unit 3 has been ceased while the main storage unit continues to be heated. This will make it more likely that the smaller unit is always able to make a rapid start-up. At the same time the one-way valve 4 will prevent ammonia from being introduced into the main storage unit 2 from the smaller start-up storage unit 3 when the pressure in the latter is higher, particularly during start-up.

In the embodiments shown, the one-way valve 4 is connected to a main storage unit 2 in such a way that gas is only allowed to flow away from the main storage unit 2. The gas can flow from the one-way valve 4 either to the start-up storage unit 3 or to the dosing unit 5. On the downstream side of the one-way valve 4 (between the valve 4 and the start-up storage unit 3) the pressure sensor 6 monitors the pressure.

Figure 2:
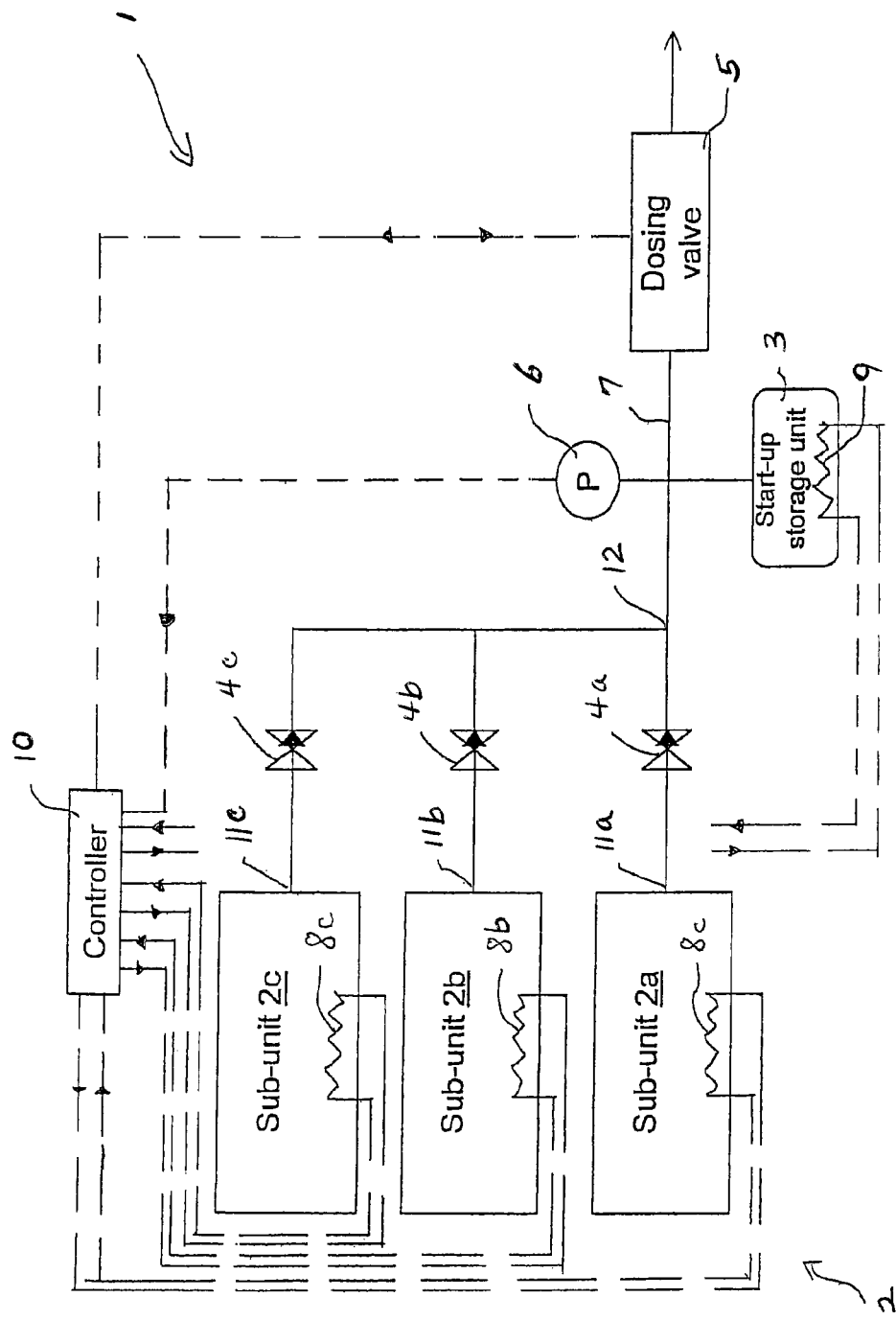
FIG. 2 is a diagram of an embodiment similar to FIG. 1, however, with the main storage unit being composed of a plurality of sub-units connected in parallel.
Figure 3:
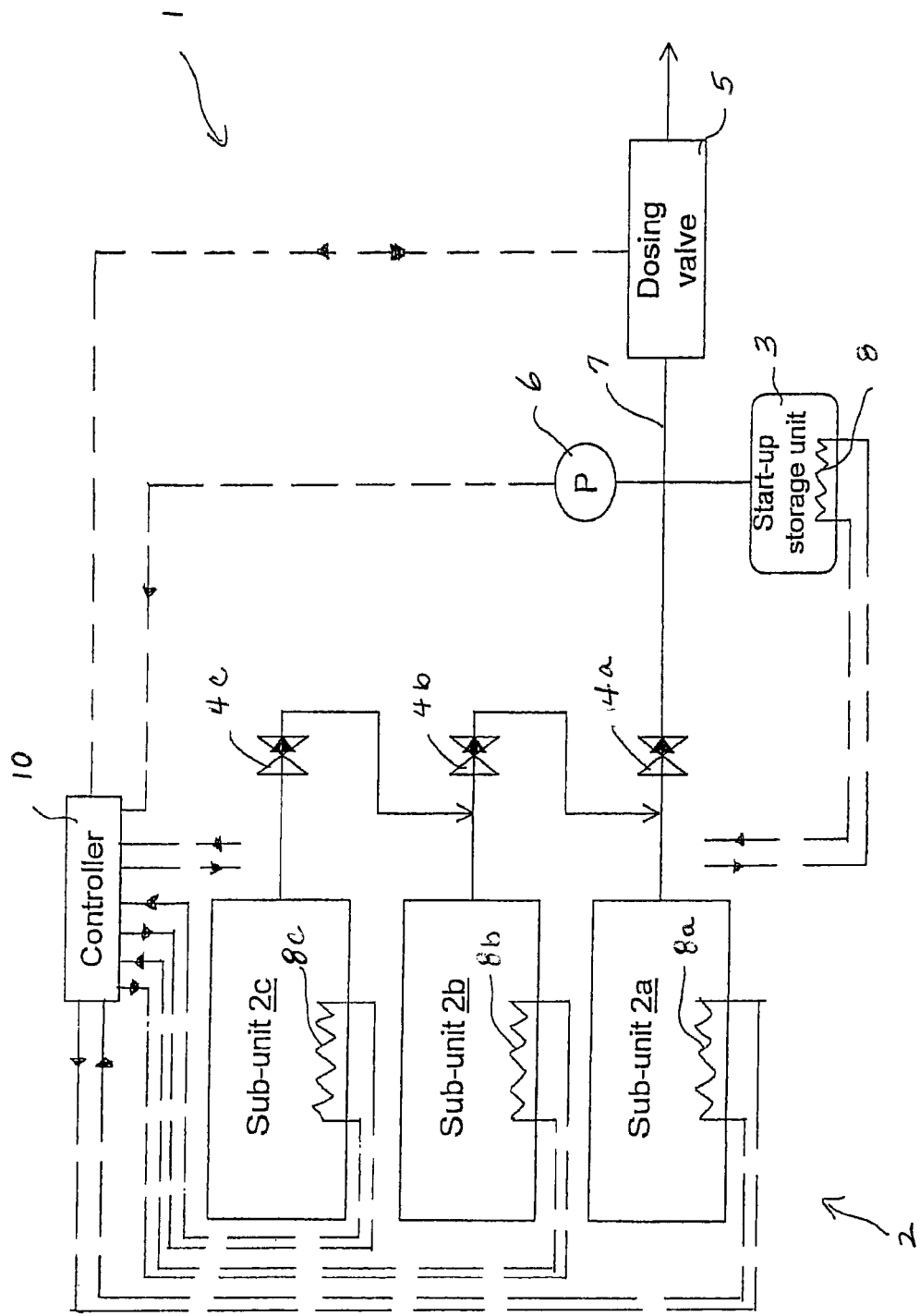
FIG. 3 is a diagram similar to FIG. 2 of another embodiment with the main storage unit being composed of a plurality of serially connected sub-units.

The embodiments of FIG. 2 corresponds to that of FIG. 1, apart from the main storage unit being composed of a plurality of sub-units connected in parallel (FIG. 2) or serially (FIG. 3). Regarding the other features, reference is made to the detailed description of FIG. 1 above, which also applies to the embodiments of FIGS. 2 and 3.

In both the embodiments of FIGS. 2 and 3 the main storage unit 2 is composed of a plurality of (on the examples shown: three) sub-units 2a, 2b, 2c that have their own heating devices 8a, 8b, 8c. Heating power supplied to the sub-units 2a, 2b, 2c is individually and selectively controllable by the controller 10.

In the embodiment of FIG. 2, the sub-units 2a, 2b, 2c are connected in parallel by tubing 7. Each sub-unit 2a, 2b, 2c is equipped with its own passive one-way valve 4a, 4b, 4c. The up-stream side of each one-way valve 4a, 4b, 4c is connected with the ammonia outlet 11a, 11b, 11c of its respective sub-unit 2a, 2b, 2c. The downstream sides of all the one-way valve 4a, 4b, 4c are joined together in a point of parallel coupling 12. As in FIG. 1, there is no pressure sensor upstream the one-way valves 4a, 4b, 4c.

Such an arrangement enables selective depletion of individual ones of the sub-units 2a, 2b, 2c, by only heating the ones to be depleted. The parallel connection and the one-way valves 4a, 4b, 4c between the sub-units 2a, 2b, 2c ensure that a sub-unit 2a, 2b, 2c that is already depleted to a greater extent than another sub-unit is not resaturated on the other sub-unit's expense. However, resaturation of the start-up storage unit 3 is governed by that sub-unit from among all the sub-units 2a, 2b, 2c that is least depleted (because it will produce the highest pressure). This, in turn, enables the start-up functionality to be particularly safe and long-running. By the use of passive one-way valves 4a, 4b, 4c, this is achieved automatically "by itself", without any actively performed switching between the sub-units 2a, 2b, 2c.

FIG. 3 is a diagram similar to FIG. 2 of another embodiment in which sub-units 2a, 2b, 2c are connected serially. Each sub-unit 2a, 2b, 2c is equipped to a passive one-way valve 4a, 4b, 4c. The upstream side of each one-way valve 4a, 4b, 4c is connected with the ammonia outlet 11a, 11b, 11c of its respective sub-unit 2a, 2b, 2c, and with the downstream side of the one-way valve 4a, 4b, 4c of the sub-unit preceding in the direction of flow (however, the one way-valve 4a of the most upstream sub-unit 2a is not connected to a one-way valve of a preceding sub-unit, because there is no preceding sub unit; similarly, the downstream side of the one-way valve 4a of the most downstream sub-unit 2a is not connected to the upstream side of a subsequent sub-unit's one-way valve, because there is no subsequent sub-unit). The down-stream side of the one-way valve 4a of the most downstream sub-unit 2a forms the outlet of the main storage container 2 and is connected to the tubing 7. As in FIG. 1, there is no pressure sensor upstream the (most downstream) one-way valve 4a.

As with FIG. 2, such an arrangement also enables selective depletion of individual ones of the sub-units 2a, 2b, 2c, by only heating the ones to be depleted. However, while in FIG. 2 the sub-units are equitable, and the order of depleting the sub-units can be freely chosen depletion, the serial connection of FIG. 3 establishes a sequential order between the sub-units 2a, 2b, 2c. As a consequence, in order to achieve the functionality mentioned above (selective depletion without resaturation of sub-units of the main storage unit, but with resaturation of the start-up storage unit), the sub-units are heated sequentially, from the upstream to the downstream sub-units (i.e. from 2c to 2b to 2a). The one-way valves 4a, 4b, 4c between the sub-units 2a, 2b, 2c ensure that a sub-unit (e.g. 2c) that is already depleted to a greater extent than the downstream sub-unit(s) (e.g. 2a and 2b) is (are) not resaturated on the other sub-units' expense. However, resaturation of the start-up storage unit 3 is governed by the downstream sub-unit(s) (e.g. 2b and 2a). This, in turn, enables the start-up functionality to be particularly safe and long-running. Again, by the use of passive one-way valves 4a, 4b, 4c, this is achieved automatically "by itself", without any actively performed switching between the sub-units 2a, 2b, 2c. Using an arrangement like the one showed in FIG. 3 gives the possibility of exploiting ammonia that would otherwise be unusable. The last fraction of ammonia in a storage unit (e.g. 2c) will not be able to maintain dosing pressure under normal operating conditions, and hence the system will change to the next storage unit in the series (e.g. 2b). While the system is depleting ammonia from a downstream sub-unit (e.g. 2b), an upstream sub-unit (e.g. 2c) can be heated up again. Although it usually cannot be used on its own for normal operation, it will still be possible to withdraw more of the ammonia in the upstream sub-unit (e.g. 2c), hereby increasing the storage capacity of the system; the ammonia released will then act as a supplement to the ammonia from the downstream sub-unit (e.g. 2b). In some cases the ammonia released from the upstream sub-unit (e.g. 2c) will be used to resaturate the down-stream sub-unit (e.g. 2b).

FIG. 4 illustrates, by means of "pseudo code", an embodiment of a method to infer the pressure $P_{main}$ in the main storage unit 2 based on a measurement of the pressure downstream the one way valve 4 (FIG. 1), or the one way valves 4a, 4b, 4c (FIG. 2), or the most downstream one-way valve 4a (FIG. 3).

The method of FIG. 4 is only carried out during a start-up phase, which means that it is only carried out as long as the pressure $P_{main}$ is below a set point pressure $P_{sp}$, (which is the target pressure for normal operation). Once the set point pressure $P_{sp}$ has been reached, the method of FIG. 4 is terminated, and a switch to a "normal mode operation" is made. It is assumed in FIG. 4 that heating of the start-up storage unit 3 and the main storage unit 2 has already been started (therefore, "Start heating" is not explicitly indicated in FIG. 4).

If accordingly $P_{main} < P_{sp}$, a test is made to what extent the main storage unit 2 is already able to produce pressure. To this end, heating of the start-up storage unit 3 is (temporarily) stopped, but dosing of ammonia is continued. The pressure is then permanently measured by means of the downstream pressure sensor 6—the measured pressure is denoted by "P" in FIG. 4.

If the measured pressure P is very low (which may be the case at the very beginning of the start-up procedure), i.e. if it is below a certain low threshold value $P_{thresh}$, the main unit is not able to produce sufficient pressure. Heating of the start-up storage unit 3 is then resumed, and the method waits a time interval dt (which is e.g. smaller than the characteristic heating time of the main storage unit 2 before it runs again through what has been described so far of the method.

If, however, $P > P_{thresh}$, the measured pressure is ascribed the main storage unit ($P_{main}$ P). If $P_{main} < P_{sp}$ the method is repeated again. If $P_{main} \geq P_{sp}$ dosing of ammonia (i.e. withdrawing of ammonia from the system 1) is performed, without resuming heating of the start-up storage unit 3.

A further condition for performing, and continuing, dosing without resuming heating is based on the accumulated amount (e.g. the accumulated mass) of ammonia. To this end, accumulated amount dosed is determined; it is denoted "Sum ($m_i$)" in FIG. 4. Dosing is continued as long as the accumulated amount Sum($m_i$) is smaller than the amount of ammonia that is activated (i.e. the amount that can be withdrawn a gas) in the volume of the start-up storage unit 3 and the downstream tubing 7 (this amount is denoted by "$m_{StartUp}$" in FIG. 4; $m_{StartUp}$ is a pre-known value as a function of the pressure P, e.g. once calculated on the basis of the geometry of the downstream system, of once experimentally determined). The reason for waiting until Sum($m_i$)$\geq m_{StartUp}$ is that the pressure P measured in the downstream system is not yet indicative of to what extent the main storage unit 2 is already able to produce pressure, as long as the measured pressure stems from ammonia still released from previous heating of the start-up storage unit 3. ($m_i$ should be smaller than the capacity of the start-up storage unit 3 without heating and the downstream tubing 7, $m_{StartUp}$).

Once Sum($m_i$)$\geq m_{StartUp}$, and provided that P is still $> P_{thresh}$, it is assumed that the measured pressure P represents the pressure $P_{main}$ in the main storage unit. In other words, it is assumed that then, by stopping heating of the start-up storage unit 3, and by dosing remaining ammonia from its previous heating period according to the current demand, the pressure down-stream the one-way valve(s) 4, 4a-c, 4a, has dropped below the upstream pressure, so that the one-way valve(s) 4, 4a-c, 4a has (have) opened, and consequently the measured pressure P is the pressure produced by the main storage unit 2 sustained by it during ongoing dosing, rather the pressure produced by the start-up unit. Then, heating of the start-up storage unit 3 is resumed, and the method waits a time interval dt (which is e.g. smaller than the characteristic heating time of the main storage unit 2) before it runs again through what has been described so far.

So far, an algorithm has been described how $P_{main}$ is determined without actually having a pressure sensor upstream of the one-way valve. If now $P_{main}$ is equal or above the set point pressure $P_{sp}$, the method of FIG. 4 is terminated, and control is switched from start-up operation to normal mode operation. For example, in normal mode operation, heating of the start-up storage unit 3 is terminated (so that the start-up storage unit 3 can re-saturate) and the main storage unit 2 is now the only supplier of ammonia, e.g. based on a demand-based feed-forward control of the heat power supplied to the heating device(s) 8 (or 8a, 8b, 8c), in parallel to demand-based dosing by the dosing valve 5.

This method can be summarised as follows: when the system is started, both the main storage unit and the smaller (rapid) start-up unit will be heated. The smaller unit will quickly build up an ammonia pressure and the pressure registered will thus be the pressure of the smaller unit. At intervals, dt, (which may vary) the power to the smaller unit is turned off, while the dosing of ammonia according to the current demand is continued. Dosing ammonia will cause the pressure of the smaller unit to decrease, because the power is turned off. If the pressure continues to drop to a lower pressure threshold, the power of the smaller unit will be turned on again, and the main storage unit will still be heated according to a start-up schedule. If the pressure does not drop below the set point pressure for the main storage unit(s), and the system is capable of dosing more ammonia than what is required to bring the start-up down in pressure, the start-up is turned off, and the main unit is switched to normal operation mode. In normal operation mode the power regulation is e.g. done according to a feed-forward control. Preferably dt is smaller than the characteristic heating time of the main storage unit(s).

An alternative way to determine when one or more of the main storage units has built up sufficient pressure is to check for irregular pressure events. Irregular pressure events occur due to the pressure interactions between the fluid upstream and downstream of the one-valve. In some cases this will cause the one-way valve to open, resulting in an irregular pressure event. One example of an irregular pressure event is (but not limited to) the small but rapid increase in pressure, that occurs when the one-way valve opens. This pressure "spike" is created because the check valve requires a small overpressure to open. When a pressure "spike" is observed it indicates that the measured pressure is the pressure in the main storage unit. Another example of an irregular pressure event (but not limited to) could be a situation where the pressure is decreasing (due to an ammonia demand) but the rate of the pressure decrease changes abruptly. This indicates that the pressure of the start-up unit has dropped below that of the main storage unit. The pressure of the main unit can thus be identified and compared to the set point pressure of the main unit.

Figure 5:
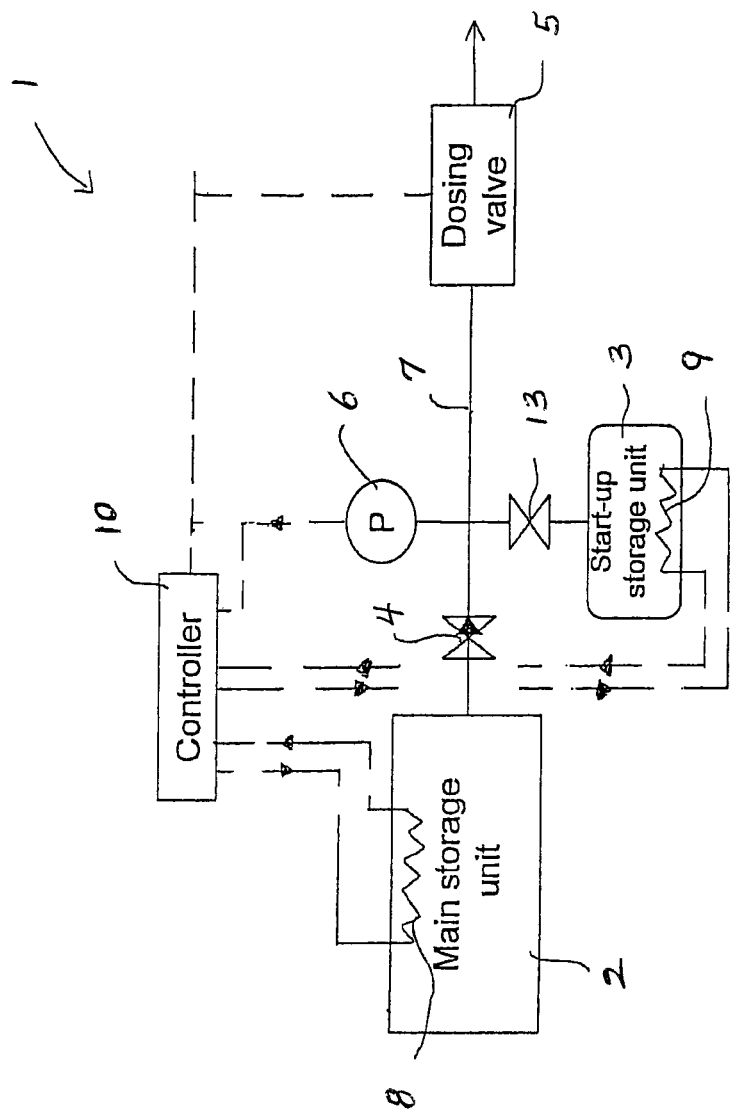
FIG. 5 is a schematic diagram of an embodiment similar to FIG. 1, but with a normally-open valve to close the start-up storage unit.

FIG. 5 is a schematic diagram of an embodiment similar to FIG. 1, but with a normally-open valve to close the start-up storage unit, and FIG. 6 illustrates an embodiment of a method to infer the pressure in the main storage unit based on a measurement of the downstream pressure for an embodiment with a normally-open valve, as in FIG. 5.

The embodiments of FIGS. 5 and 6 correspond to those of FIGS. 1 to 4, respectively, apart from a normally open-valve 13 enabling to start-up storage unit 3 to be closed under the control of the controller 10. A consequence of this is a small related modification of the method to determine $P_{main}$ of FIG. 4. Regarding the other features, reference is made to the detailed description of FIGS. 1 to 4 above, which also applies to the embodiments of FIGS. 5 and 6.

The normally open valve 13 is placed such that it can close the connection to the downstream tubing 7, as shown in FIG. 5. When the system 1 is started the smaller start-up storage unit 3 will quickly reach dosing pressure, as in FIG. 4. To determine the pressure $P_{main}$ in the main storage unit 2 the normally open valve 13 is closed (heating of the start-up unit 3 can be stopped, but could also be carried on), and an amount of ammonia larger than the volume $m_{tubing}$ in the tubing 7 downstream the normally open valve 13 is dosed. Thus, one difference over the method of FIG. 4 is that dosing continues until $Sum(m_t) \geq m_{dosing}$ ($m_t$ should be smaller than the capacity of the downstream tubing 7, $m_{tubing}$). If the pressure P drops below the lower threshold pressure $P_{thresh}$ the normally open valve 13 is reopened (and heating of the start-up unit is resumed, in embodiments in which it was stopped). If the system is capable to sustain a pressure higher than the lower pressure threshold and keep dosing, the pressure measured is assumed to be the pressure in the main storage unit 2, as in FIG. 4.

Figure 7:
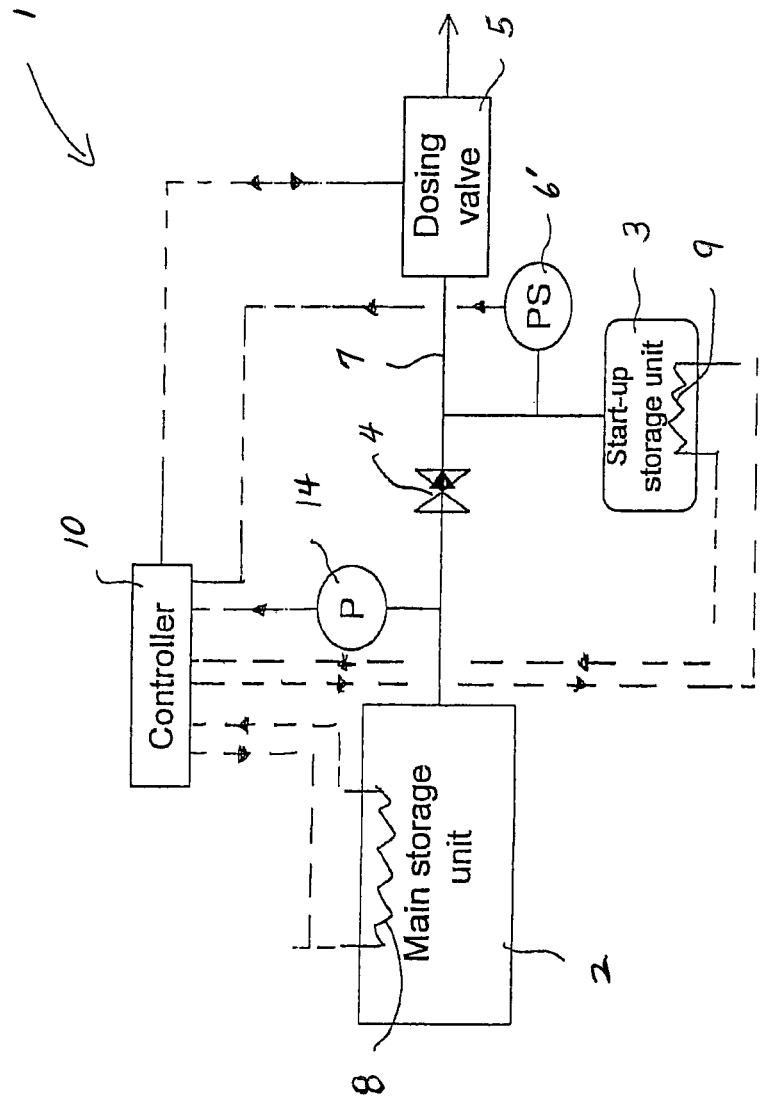
FIG. 7 is a schematic diagram of an embodiment similar to FIG. 1, but with a pressure switch (or pressure sensor) upstream the one-way valve.
Figure 8:
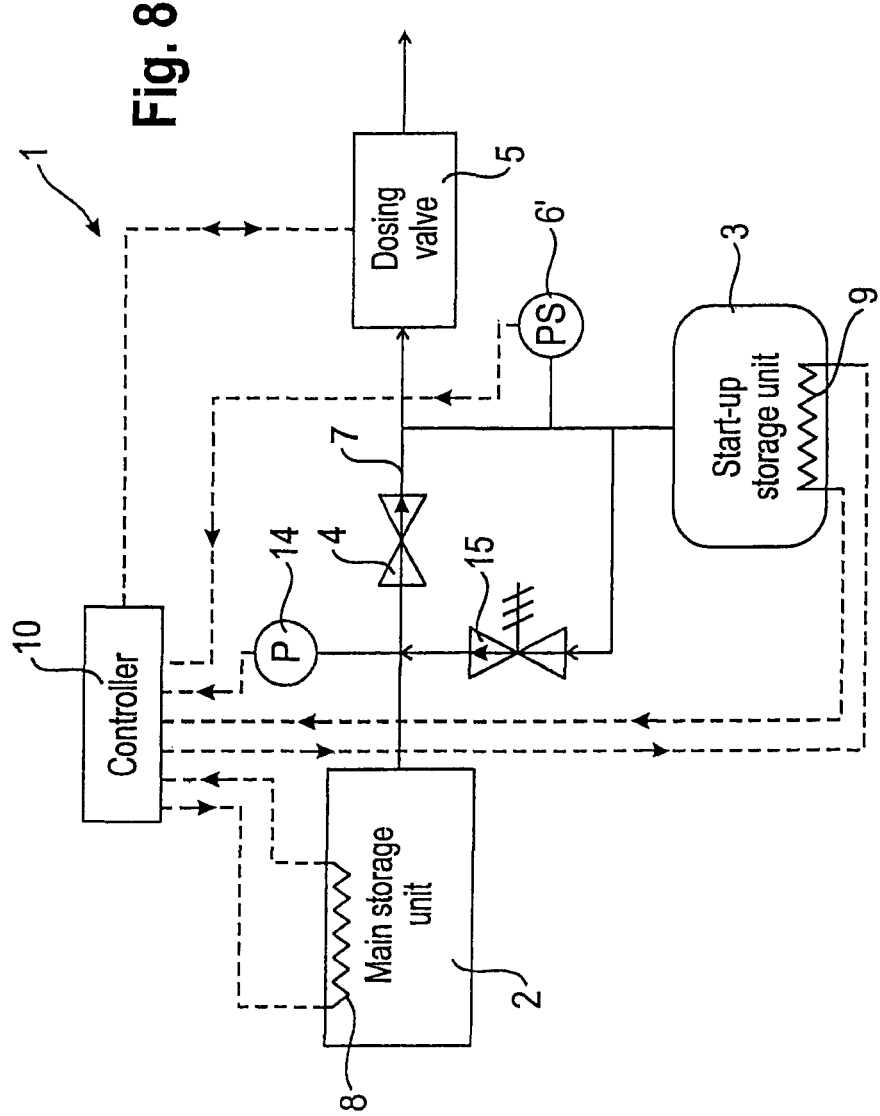
FIG. 8 is a schematic diagram of an embodiment similar to FIG. 7, but with an additional pressure relief valve than can relieve pressure from the start-up storage unit into the main storage unit.

FIG. 7 is a schematic diagram of an embodiment similar to FIG. 1, but with an additional pressure sensor 14 upstream of the one-way valve 4, but downstream of the main storage unit(s) 2. In some embodiments of this type, the downstream pressure sensor 6 is replaced by a simple yes/no pressure indicator (pressure switch) 6', that only indicates whether the indicator is below or above a certain pressure value, in order to monitor the smaller (rapid) unit 3 during the start-up phase. This will give an explicit measurement of the pressure in the main storage unit 2. If the main storage unit has a plurality of sub-units, the upstream pressure sensor 14 will indicate the highest pressure. If, e.g., two sub-units units are heated simultaneously, the pressure of the sub-unit with the lowest pressure can be determined by using the algorithm described for the system shown in FIG. 4.

FIG. 8 shows an ammonia storage and delivery system 1 with a main storage unit 2 and a start-up storage unit 3, as in FIG. 7. The main storage unit 2 and the start-up storage unit 3 are in fluid-communication via a passive one-way valve 4. The start-up storage unit 3 is in fluid-communication with a dosing valve 5 by which ammonia from the main storage unit 3 is dosed according to demand. A pressure relief valve 15 is provided between the start-up storage unit 3 and the main storage 2 (or the upstream tubing). The pressure relief valve is a one-way valve allowing flow only in the direction from the start-up storage unit 3 to the main storage unit 2. If the pressure difference between start-up storage unit 3 and main storage unit 2 reaches a certain (relatively high) level (well above $P_{thresh}$) the pressure relief valve opens for "back-flow" from the start-up storage unit 3 to the main storage unit 2. This will decrease the pressure in the start-up storage unit 2, but increase the pressure in the main storage unit 2. In some embodiments, the pressure relief valve 15 is controllable; it is controlled in such a manner that pressure relief into the main storage unit 2 is only enabled as long as heat is supplied to the start-up storage unit 3.

Although the pressure relief valve 15 is shown in FIG. 8 in conjunction with an upstream pressure sensor 14 (as in FIG. 7), this is only exemplary; a pressure relief valve 15 can also be used in all the other embodiments described and/or shown in the figures.

What is claimed is:

1. A system for storage and dosing of ammonia that comprises a solid ammonia storage material capable of binding and releasing ammonia reversibly by adsorption/absorption, said system being able to release ammonia gradually according to a demand that can vary over time with intermediate periods of no ammonia demand, said system comprising:
    a main storage unit and a start-up storage unit, the storage units holding ammonia storage material;
    at least one one-way valve via which the main storage unit is in communication with the start-up storage unit;
    heating devices arranged to heat the main storage unit and the start-up storage unit separately to generate gaseous ammonia by thermal desorption from the solid storage material;
    a controller configured so as to control the heating power of the main storage unit and the start-up storage unit, thereby enabling ammonia release from at least one of the start-up and the main storage unit;
    a dosing valve arranged to control ammonia flow from the storage units according to a demand; and
    a pressure sensor arranged downstream of the at least one one-way valve arranged to measure the pressure in connecting tubes between the at least one one-way valve and the dosing valve;
wherein the controller, or another controller, is arranged to determine when the main storage unit is ready for ammonia release in a situation where the start-up storage unit has been used for rapid start-up while waiting for the main storage unit to be operable by determining the pressure in the main storage unit during a start-up phase in which the heating of the start-up storage unit and the main storage unit has already been started by:
    (a) interrupting ammonia release from the start-up storage unit,
    (b) relieving pressure in the system,
    (c) measuring the pressure which is caused to decrease by
        (a) and (b) with the pressure sensor downstream from the at least one one-way valve, and inferring from this measurement the pressure of the main storage unit, and wherein the controller, or another controller, is arranged such that, if the pressure inferred of the main storage unit has not yet reached a desired ammonia supply pressure for normal operation, to repeat the pressure determination according to activities (a) to (c) or, if the pressure inferred in the main storage unit has reached the desired ammonia supply pressure, to cease heating of the start-up storage unit and enable the start-up unit to begin to resaturate when the pressure in the main unit is higher than the pressure in the start-up unit.

2. The system of claim 1, wherein resaturation of the start-up unit takes place when heating of the start-up unit is ceased and the ammonia pressure in the main storage unit is higher than in the start-up storage unit.

3. The system of claim 1, wherein the system does not have a pressure sensor upstream of the at least one one-way valve, or does not use a pressure sensor upstream of the at least one one-way valve to measure the pressure in the main storage unit.

4. The system of claim 1, wherein the controller, or another controller, is configured to determine the pressure of the main storage unit based on a measurement of the pressure downstream of the at least one one-way valve.

5. The system of claim 4, wherein the controller, or another controller, is configured to determine the pressure in the main storage unit based on at least one of (i) the amount of ammonia released through the dosing valve, and (ii) the heating power used for the start-up unit.

6. The system of claim 1, wherein the controller, or another controller, is configured to interrupt ammonia release from the start-up storage unit by turning off the heating of the start-up storage unit.

7. The system of claim 1, further comprising a normally open valve located at the outlet of the start-up storage unit, wherein the controller, or another controller, is configured to achieve the interruption of ammonia release from the start-up storage unit by closing the normally open valve.

8. The system of claim 1, wherein the controller, or another controller, is configured to achieve said pressure relief by continuing dosing of ammonia.

9. The system of claim 1, wherein the controller, or another controller, is configured to infer the pressure in the main storage unit from the pressure measured downstream from the at least one one-way valve by assuming that it is the pressure measured, provided that the amount dosed after having stopped the heating of the start-up unit is larger than the available ammonia amount downstream the at least one one-way valve and the start-up unit.

10. The system according to claim 1, wherein the controller, or another controller, is configured to determine the pressure in the main storage as the measured pressure at the time, when one or more irregular pressure events indicating that said one-way valve opens are measured with the pressure sensor down-stream of the at least one one-way valve.

11. The system according to claim 1, where the start-up unit is dimensioned such that a desired ammonia supply pressure is reached in a desired time independent of the heating time of the main storage or units.

12. The system of claim 1, further comprising a pressure relief valve allowing flow from the start-up storage unit to the main storage unit once a certain pressure is reached.

* * * * *